Nov. 18, 1952 A. PANKEN 2,618,730
COLLAPSIBLE BROILER AND BARBECUE DEVICE
Filed June 7, 1952 3 Sheets-Sheet 1

*INVENTOR.*
Albert Panken

Nov. 18, 1952  A. PANKEN  2,618,730
COLLAPSIBLE BROILER AND BARBECUE DEVICE
Filed June 7, 1952  3 Sheets-Sheet 2
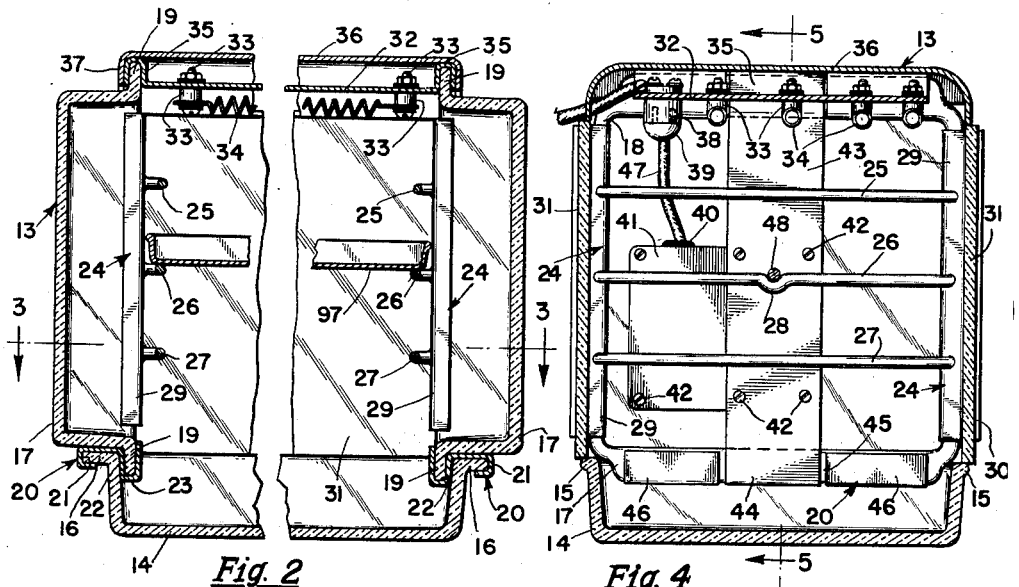
Fig. 2
Fig. 4
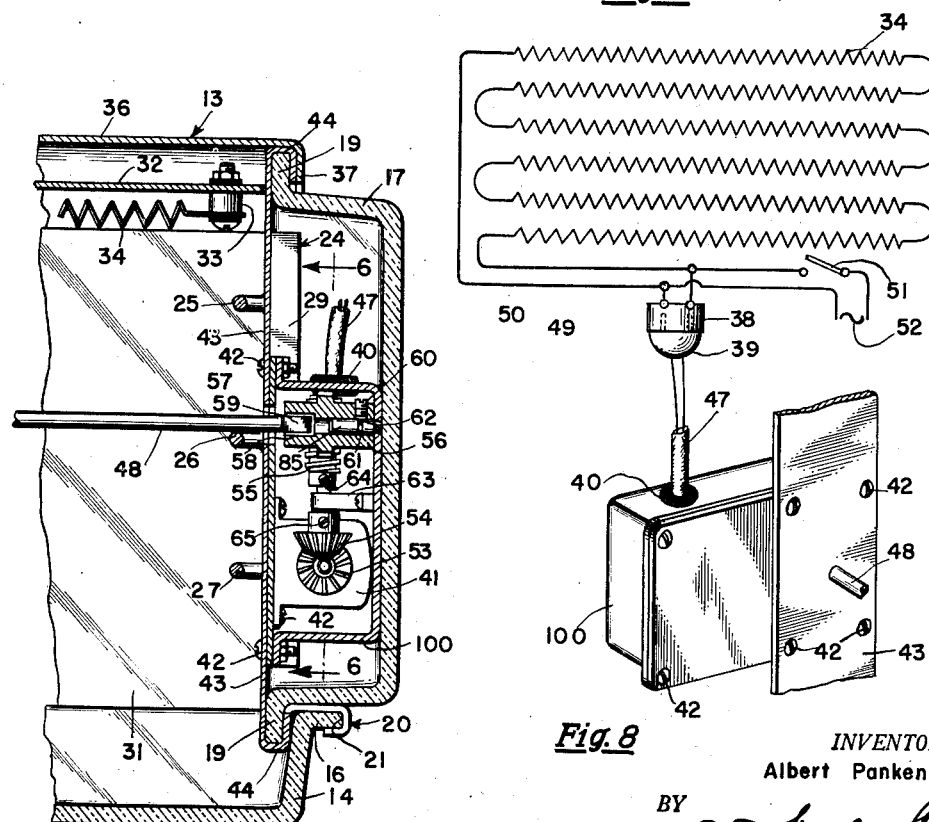
Fig. 5
Fig. 8
INVENTOR.
Albert Panken
BY
David Manly Geller
Attorney Nov. 18, 1952          A. PANKEN          2,618,730
COLLAPSIBLE BROILER AND BARBECUE DEVICE
Filed June 7, 1952          3 Sheets—Sheet 3
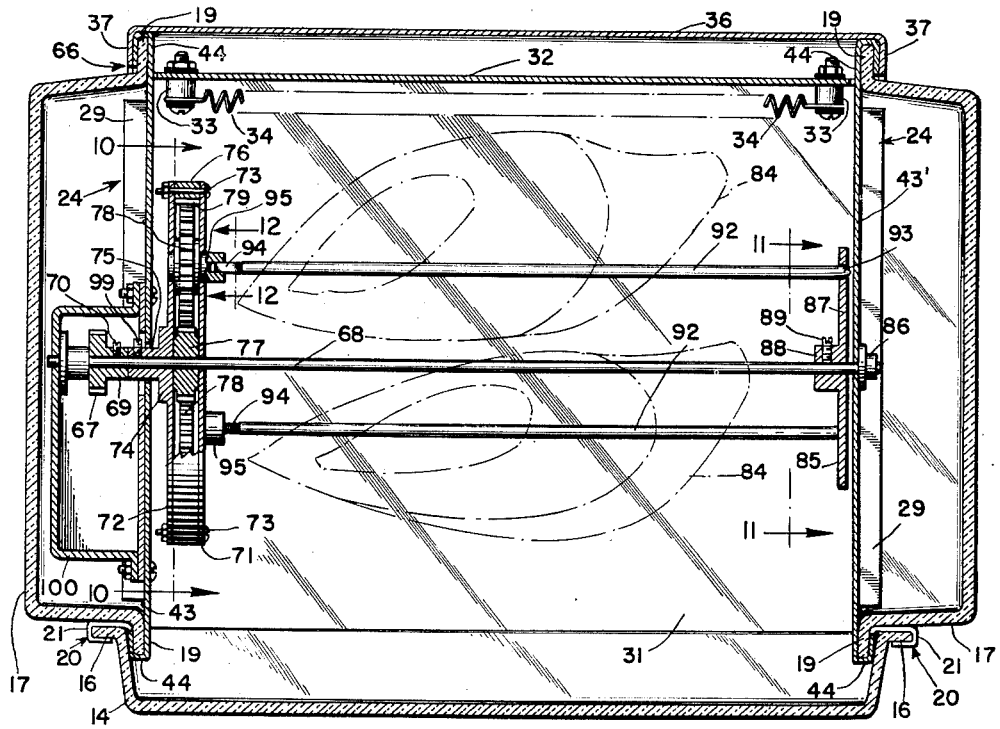
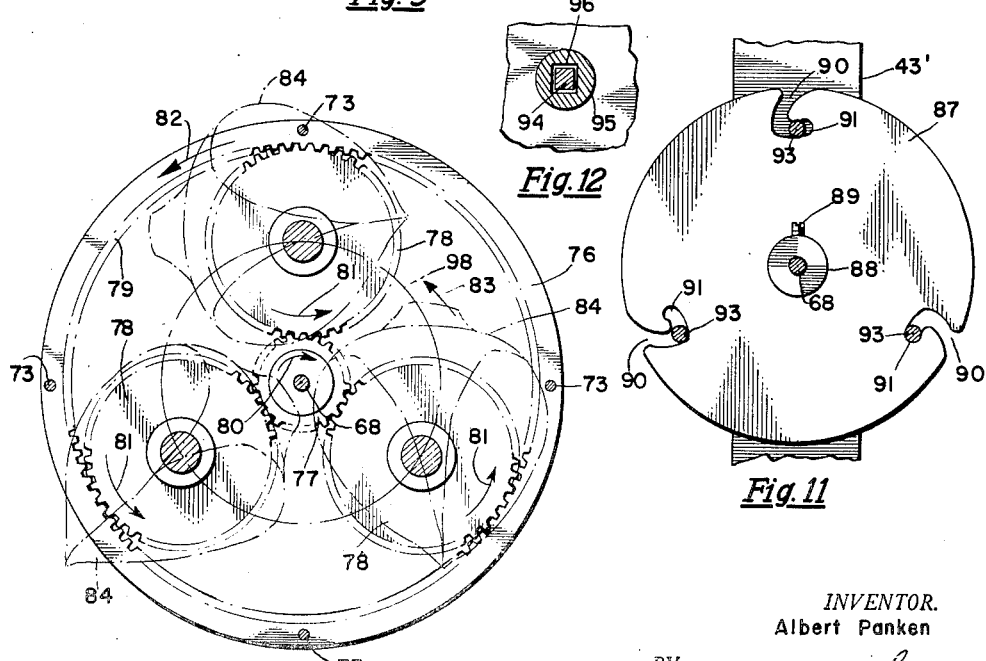
*INVENTOR.*
Albert Panken
BY
*Attorney*

Patented Nov. 18, 1952

2,618,730

UNITED STATES PATENT OFFICE 2,618,730

COLLAPSIBLE BROILER AND BARBECUE DEVICE

Albert Panken, Chicago, Ill.

Application June 7, 1952, Serial No. 292,269

11 Claims. (Cl. 219—35)

My invention relates to combination barbecue and broiler devices, having particular reference to the type that is of a knock-down construction and which can be readily assembled for operative purposes.

An important object of my invention is to provide a device of the aforementioned character which is made up of conventional heat resistant glass pans assembled together with assembling clip means and motor support means, utilizing preferably, electrical heating unit means, and cover enclosure means for supporting a broiling tray or pan on which food may be broiled; providing at the same time means for supporting the pan at various levels so as to subject it to varied intensities of heat; the said unit also being adaptable to support a meat mounting spit on which meat or fowl may be mounted for barbecuing operations.

Another object of my invention is to provide a device of the aforementioned character which is transparent on five of its six surfaces, thus permitting constant inspection and supervision of the food that is being broiled or barbecued.

A still further object of my invention is to provide in an article of the aforementioned character a number of elements which may be readily assembled or knocked down for transportation purposes, and readily assembled when desired.

A still further object of my invention is to provide a modified structure of the aforementioned character which will support a multiplicity of spit means so that a larger number of food items may be barbecued thereupon.

A still further object of my invention is to provide a device of the aforementioned character, in which the multiple spit means is, preferably, arranged in triangular relationship, providing planetary gearing for driving the said spit means, so that the food items mounted on each individual spit will rotate about a circular orbit on each individual spit, yet will rotate also about the axis of the triangular formation hereinbefore referred to, so that each food item will rotate upon its respective spit means, and present a different surface of the said food item to the heating element for each cycle of rotation of the entire combined multiple spit holding unit.

A still further object of my invention is to provide a device of the aforementioned character which is readily assembled or knocked down, which is made up of conventional glass pans, which may, incidentally, also be used for their individual purposes, and an article which is capable of use as a broiler, or as a barbecue device, which is made up of simple elemental parts so that it may be manufactured economically in quantity production.

Other objects and advantages inherent in my invention will become apparent from an examination of the accompanying drawings, bearing further elucidation in the ensuing description, where like symbols are used to designate like parts, and in which;

Fig. 2 is a cross-sectional view taken, substantially, on the lines 2—2 of Fig. 1.

Fig. 3 is a cross-sectional view taken, substantially, on the lines 3—3 of Fig. 2.

Fig. 4 is a cross-sectional view taken, substantially, on the lines 4—4 of Fig. 3.

Fig. 5 is a cross-sectional view taken, substantially, on the lines 5—5 of Fig. 4.

Fig. 6 is a cross-sectional view taken, substantially, on the lines 6—6 of Fig. 5.

Fig. 7 is an enlarged perspective view showing the clearance cut-out portion in the clip elements to permit assembling the same to the glass pan means hereinbefore referred to.

Fig. 8 is a perspective view showing the motor or prime mover unit, also showing schematically a wiring diagram connecting the prime mover means optionally to the heat element means circuit, an essential feature of my invention.

Fig. 9 is a cross-sectional view, similar to Fig. 5, showing a slight modification of my invention, wherein a multiple spit supporting unit is indicated, and a number of spits removably and rotatably secured thereto.

Fig. 10 is a view looking in the direction of arrows 10—10 of Fig. 9.

Fig. 11 is a view looking in the direction of arrows 11—11 of Fig. 9.

Fig. 12 is a view looking in the direction of arrows 12—12 of Fig. 9.

Figure 1:
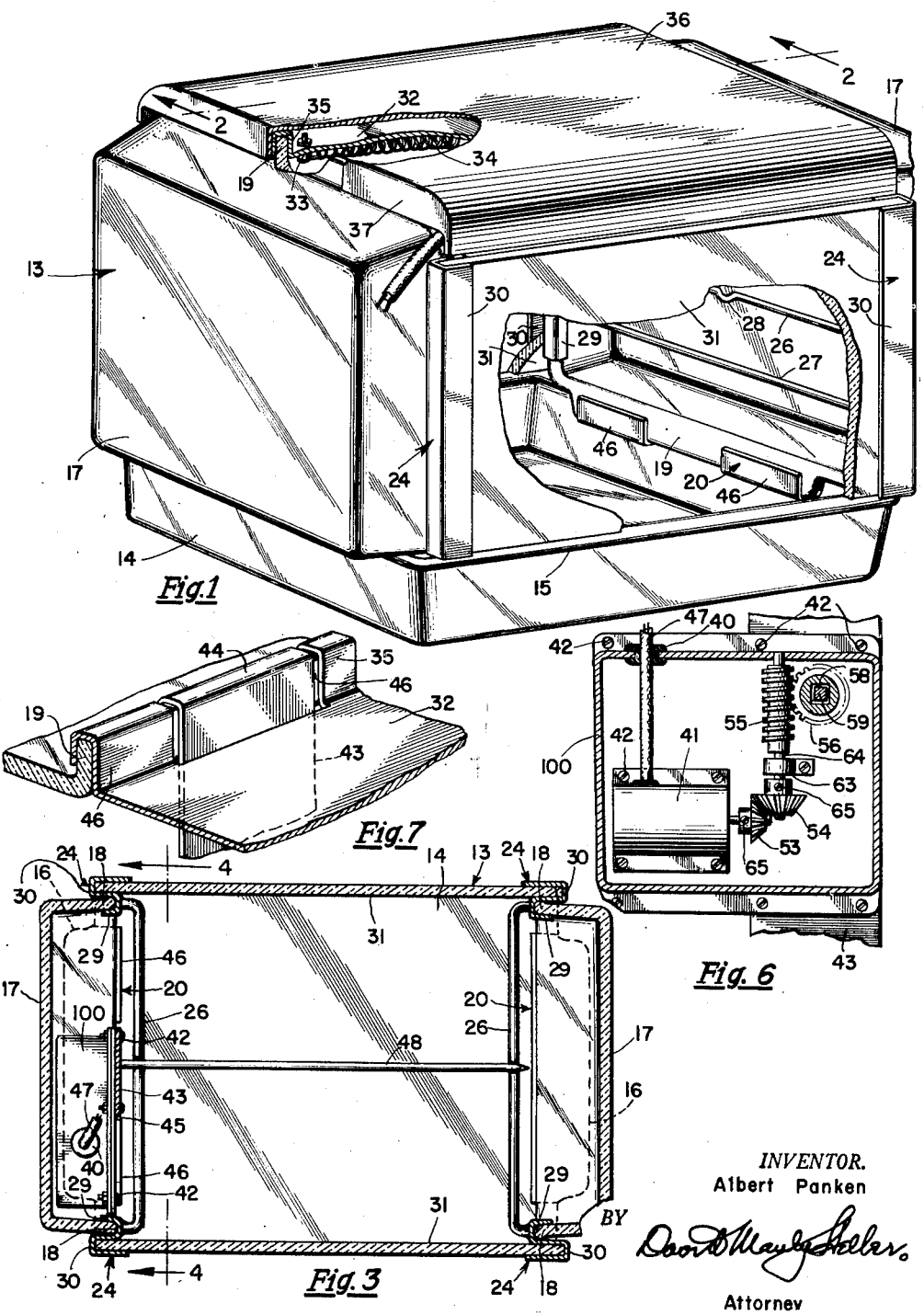
Fig. 1 is a perspective view of one form of my invention.

Referring to the various views, my invention is generally designated 13, and consists of a number of heat resistant glass pans designated 14 for the bottom pan, and 17 for the two end pans mounted removably thereto. The pan 14 is provided with a beaded portion 15, and a lip or handle portion 16 on each end thereof. Likewise, the pans 17 are provided with beaded portions 18 on opposite sides thereof and lips 19 at the other two ends thereof.

The pans are assembled to form a tri-lateral U-shaped arrangement as indicated in Fig. 1 by virtue of the clip elements generally designated 20. The clip elements 20 are provided with a channel portion 21 for engaging the lip element 16 of the bottom pan 14. They are also formed to supply a right-angularly and downwardly bent portion 22 to form a channel portion 23 in right-angular relationship to the channel portion 21.

In the channel portion 23 the lip 19 of pan 17 is frictionally and firmly retained. Thus it can be seen that the end pans 17 are firmly but removably assembled to the bottom pan 14. The top lips 19 are held together by the heating element support plate 32 which is provided with channelled portions 35 engaging frictionally and firmly the upper lips 19 thus forming a rigid assembly.

Over the entire arrangement a cap element 36 having a flange portion 37 is secured also frictionally and removably so that the same can be readily dismantled. On the heating element support plate 32 are mounted a series of binding posts 33 to which are connected the Nichrome wire heating elements 34 which afford proper resistance so that when an electric current is passed therethrough they will become incandescent and furnish the heat necessary.

The beaded portions 18 of the pans 17 have secured thereto, the clip elements 24 which have the channelled portions 29 to fit the beaded portions 18 and are also provided with opposed channelled portions 30 for securing removably therein glass window panes 31, so that the entire unit is completely enclosed except for the corners near the cap element 36 which afford some ventilation and circulation of air currents.

The clip elements 24 are assembled in pairs by the support wires 25, 26 and 27 which are used to hold a broiling pan 97 removably thereupon, so that meat or other food to be broiled can be broiled thereupon. The broiling pan 97 may be positioned at different levels indicated on the support rods 25, 26 and 27 which are riveted or spot welded, to a pair of clips 24 so that varied heat intensity may be imparted to the foods to be broiled within the pan 97.

The central rod element 26 is provided with an arcuately formed locating portion 28 which acts as a bearing for the spit 48 mounted thereon. The other end of the spit is equipped with a square portion 59 which fits into the enlarged square holes 58 so as to facilitate the positioning and removal of the spit 48.

The clip elements, generally, designated 20 are provided with a cut-out portion 45 to provide a clearance for mounting the channelled portion 44 of the motor support bracket 43; leaving portions 46 for attachment to lip 19; the bracket 43 is secured in straddling relationship on one pan to the lower lip 19 and the upper lip 19. The heating element support plate 32 is similarly cut out at 46 in order to clear the channelled portion 35, so as not to impede the assembly of the said element and also form a smooth streamlined structure to receive the flange 37 of the cap element 36.

The motor support bracket 43 has secured thereto a housing 100, the motor 41 being secured to the motor plate 43 by screws 42 as shown. The motor unit 41 has a bevel driving pinion 53 which is in mesh with the bevel gear 54, each secured by set screws 65 and further supported in the bearing 63 fitted on the reduced extension 64 of the worm 55; the said worm is in meshing relationship with a worm gear 56 which has a hub 57 in which the square hole 58, which is somewhat enlarged, receives the square end 59 of the spit 48.

The worm gear 56 is mounted on a stub shaft 85 secured to the casing 100, and the said shaft 85 is provided with a groove 61 in which a shank 62 of the set screw 60 maintains it rotatably on the said stub shaft 85.

The electrical connection 47 emanates at 48 and is connected to the motor 41 and as seen in Fig. 8 is provided with a male plug 39, which can be optionally connected to an outlet 38 connected in parallel with the electrical circuit 49 and 50 in which the heating elements 34 are connected in series to a source of supply 52, and a switch element 51 is connected in the series circuit so as to afford a convenient control for an operator.

The spit is removably mounted by virtue of the square shoulder 59 fitting into the enlarged square hole 58 of the worm wheel 56, which is driven by the worm 55, receiving its motivation from the meshing bevel gears 54 and 53.

Thus items may be broiled in a pan 97 as shown in Fig. 2, or fowl, or barbecued beef, or spareribs, may be mounted on the spit 48, and then rotated so as to provide a uniform and even heating circumferentially thereof, by virtue of the heating means 34. When broiling, the plug 39 is disconnected from the outlet 38. When barbecuing on spit 48, the motor connection is effectuated by virtue of the plug 39 and 38 being assembled to close the parallel circuit operating the motor unit 41.

A modified form of my invention is illustrated in Figs. 9, 10, 11 and 12 and the structure depicted thereon is generally designated 66, the worm wheel 67 is driven by similar transmission as indicated in Figs. 5 and 6. The said worm wheel is equipped with a hub 69 secured to a central mounting shaft 68 by virtue of the set screw 70. The planetary gearing consists of plates 71 and 72 confining therein a ring gear 76 and is secured by screws and nuts or fastenings 73. The ring gear 76 is of an internal type and has teeth 79 therein in meshing relationship with the driven gears 78 arranged in triangular relationship, and simultaneously in meshed relationship with the idler gear 77 which is mounted on the supporting shaft 68, and is connnected to the planetary assembly by virtue of the hubs 74 and 75 which will rotate with the shaft 68.

The outer ring gear 76 is driven in the direction of the arrow 82 by the shaft 68 which in turn imparts rotation to the driven gears 78 in direction of arrow 81 held in meshing relationship centrally by virtue of the idler gear 77 motivated idly in the direction shown by arrow 80. In this particular instance I also provide a support 43' which is secured in the same manner as the motor support 43, so as to furnish extra support to the multiple number of spits, and the weight of the food commodities mounted thereupon, in this particular instance being fowl 84. The hub 75 is secured to shaft 68 by set screw 99.

The supporting plate 43' has secured thereto a bearing 86 which supports the other end of the mounting shaft 68, and the same is secured to the auxiliary spit mounting plate 87 provided with a hub 88 and secured to the mounting shaft 68 by means of the set screw 89.

Looking at Fig. 11, it will be seen that the auxiliary support disc or plate 87 is provided with angularly formed cutouts 90, with undercut pocket portions 91 to hold the pointed ends of the spits 93 rotatably confined therein, preventing the escape thereof during the barbecuing operation. The other ends of the spits 92 are provided with a reduced square shoulder 94 fitted into the enlarged square hole 96 of the hub 95, three of such hubs being provided on the plate 71, so that the spits can be readily inserted into the multiple support unit 66, or readily removed from the said support unit, whenever the operation of barbecuing has been completed.

It will be noted, especially in referring to Fig. 10, that the ring gear 76 rotates in the direction indicated by arrows 82; the driven gears 78 rotate in the direction of arrows 81. The entire assemblage as indicated, by the center line 98 rotates in the direction of arrow 83, however, there is a relative variation of motion and speed indicated by the arrow 83 with reference to that of arrow 82 so that although the entire unit rotates about the shaft 68, each individual spit 92 rotates in an independent orbit simultaneously as indicated by arrows 81 about the spit as an axis for the orbit of operation in the direction shown by arrow 81. The number of teeth on gear 76 are not an exact multiple of the number of teeth on each of the gears 78.

Thus, when the operation of barbecuing takes place, a different portion of each chicken 84, after each cycle of rotation as indicated by arrow 82, will be presented to the heat rays emanating from the heating element 34.

In operation, if it is desired to broil or barbecue, the unit is first assembled by assembling the pan 14 to the two pans 17 by virtue of clips 20 as hereinbefore described. The heating support plate 32 supporting the heating element 34 is then mounted on the top lips 19 of the pan 17. The cap 36 is placed thereover, the rear glass pane 31 is inserted, and the pan 97 is placed on the proper supporting rod 25, 26 or 27 and food placed thereon, and the operation is ready to continue when the circuit is closed by switch 51. In this instance the plug 39 and outlet 38 are not connected inasmuch as the operation of the motor is unnecessary. The front pane of glass 31 is then inserted, the said panes also being of heat-resistant glass prevents breakage thereof and also permits viewing the operation of broiling. When the broiling is completed the food pan 97 is removed and the contents consumed.

When it is desired to barbecue fowl or meat, the said fowl or meat is mounted on spit 48, and the spit is then placed in engagement with the driving worm 56 and the plug 39 is connected to the outlet 38, in which event the motor also operates; the operation may also be carefully guarded or watched in order to determine the completion of cooking to a desirable result of the fowl 84.

If the unit shown in modification of Figs. 9 to 12 is utilized, then each spit 92 has mounted thereon a fowl 84, or meat, or other foods, that it is desired to barbecue, and the motor is permitted to operate in a parallel circuit with the heating element 34 and thus the food is barbecued.

The device can be readily knocked down for transporting purposes, or for shipment by the manufacturer, and the pans 14 and 17 being of conventional construction may be individually purchased by the person purchasing the other elements of construction, or the entire device may be sold in a knocked-down arrangement, suitably crated and shipped to points of distribution.

It is to be understood that changes may be made in the construction and in the combination and arrangement of the several parts, provided that such changes fall within the scope of the appended claims.

Having thus disclosed and revealed my invention, what I claim as new and desire to secure by Letters Patent is:

1. Combination knockdown and erectable broiler and barbecue means, comprising a bottom pan and a pair of side pans all mounted in "U-shaped" formation, each of the said pans being provided with lip portions on two opposed edges thereof, primary clip means each provided with horizontal and vertical channel portions, the lip portions of the said bottom pan engageable removably by the said horizontal channel portions, one lip portion of each of said side pans engageable removably by the said vertical channel portion, heating element support means provided with channelled portions removably secured to the remaining lip portions of each of the said side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said side pans by virtue of the channel portions thereof resulting in open channel portions on each side of the said broiler and barbecue means, transparent pane means mounted removably in the said open channel portions, and cap means secured removably over the said heating element support means defining a vented enclosure, corresponding pairs of the said support wires being adapted to support a food cooking pan thereupon.

2. Combination knockdown and erectable boiler and barbecue means, comprising a bottom pan and a pair of side pans all mounted in "U-shaped" formation, each of the said pans being provided with lip portions on two opposed edges thereof, primary clip means each provided with horizontal and vertical channel portions, the lip portions of the said bottom pan engageable removably by the said horizontal channel portions, one lip portion of each of said side pans engageable removably by the said vertical channel portion, heating element support means provided with channelled portions removably secured to the remaining lip portions of each of the said side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said side pans by virtue of the channel portions thereof resulting in open channel portions on each side of the said broiler and barbecue means, transparent pane means mounted removably in the said open channel portions, cap means secured removably over the said heating element support means defining a vented enclosure, corresponding pairs of the said support wires being adapted to support a food cooking pan thereupon, motor support bracket means provided with channel portions removably secured to the lip portions of one of the said side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting position, its other end having a reduced polygonal shoulder portion adapted to fit loosely in the said polygonal central opening.

3. Combination knockdown and erectable broiler and barbecue means, comprising a transparent bottom pan and a pair of transparent side pans all mounted in "U-shaped" formation, each of the said transparent pans being provided with lip portions on two opposed edges thereof, primary clip means each provided with horizontal and vertical channel portions, the lip portions of the said transparent bottom pan engageable removably by the said horizontal channel portions, one lip portion of each of said transparent side pans engageable removably by the said vertical channel portion, heating element support means provided with channelled portions removably secured to the remaining lip portions of each of the said transparent side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said transparent side pans by virtue of the channel portions thereof resulting in open channel portions on each side of the said broiler and barbecue means, transparent pane means mounted removably in the said open channel portions, and cap means secured removably over the said heating element support means defining a vented enclosure, corresponding pairs of the said support wires being adapted to support a transparent food cooking pan thereupon.

4. Combination knockdown and erectable broiler and barbecue means, comprising a transparent bottom pan and a pair of transparent side pans all mounted in "U-shaped" formation, each of the said transparent pans being provided with lip portions on two opposed edges thereof, primary clip means each provided with horizontal and vertical channel portions, the lip portions of the said transparent bottom pan engageable removably by the said horizontal channel portions, one lip portion of each of said transparent side pans engageable removably by the said vertical channel portion, heating element support means provided with channelled portions removably secured to the remaining lip portions of each of the said transparent side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said transparent side pans by virtue of the channel portions thereof resulting in open channel portions on each side of the said broiler and barbecue means, transparent pane means mounted removably in the said open channel portions, cap means secured removably over the said heating element support means defining a vented enclosure, corresponding pairs of the said support wires being adapted to support a transparent food cooking pan thereupon, motor support bracket means provided with channel portions removably secured to the lip portions of one of the said transparent side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening.

5. Combination knockdown and erectable broiler and barbecue means, comprising a bottom pan and a pair of side pans all mounted in "U-shaped" formation, each of the said pans being provided with lip portions on two opposed edges thereof, primary clip means each provided with horizontal and vertical channel portions, the lip portions of the said bottom pan engageable removably by the said horizontal channel portions, one lip portion of each of said transparent side pans engageable removably by the said vertical channel portion, heating element support means provided with channelled portions removably secured to the remaining lip portions of each of the said side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said side pans by virtue of the channel portions thereof resulting in open channel portions on each side of the said broiler and barbecue means, transparent pane means mounted removably in the said open channel portions, cap means secured removably over the said heating element support means defining a vented enclosure, corresponding pairs of the said support wires being adapted to support a food cooking pan thereupon, motor support bracket means provided with channel portions removably secured to the lip portions of one of the said side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening, the horizontal channel portions of the said primary clip means being cut away at the central portion thereof a magnitude equivalent to the width of the said motor support bracket means.

6. Combination knockdown and erectable broiler and barbecue means, comprising a transparent bottom pan and a pair of transparent side pans all mounted in "U-shaped" formation, each of the said transparent pans being provided with lip portions on two opposed edges thereof, primary clip means each provided with horizontal and vertical channel portions, the lip portions of the said transparent bottom pan engageable removably by the said horizontal channel portions, one lip portion of each of said transparent side pans engageable removably by the said vertical channel portion, heating element support means provided with channelled portions removably secured to the remaining lip portions of each of the said transparent side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said transparent side pans by virtue of the channel portions thereof resulting in open channel portions on each side of the said broiler and barbecue means, transparent pane means mounted removably in the said open channel portions, cap means secured removably over the said heating element support means defining a vented enclosure, corresponding pairs of the said support wires being adapted to support a transparent food cooking pan thereupon, motor support bracket means provided with channel portions removably secured to the lip portions of one of the said transparent side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening, the horizontal channel portions of the said primary clip means being cut away at the central portion thereof a magnitude equivalent to the width of the said motor support bracket means.

7. Combination knockdown and erectable broiler and barbecue means, comprising a bottom pan and a pair of side pans all mounted in "U-shaped" formation, each of the said pans being provided with lip portions on two opposed edges thereof, primary clip means each provided with horizontal and vertical channel portions, the lip portions of the said transparent bottom pan engageable removably by the said horizontal channel portions, one lip portion of each of said side pans engageable removably by the said vertical channel portion, heating element support means provided with channelled portions removably secured to the remaining lip portions of each of the said side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said side pans by virtue of the channel portions thereof resulting in open channel portions on each side of the said broiler and barbecue means, transparent pan means mounted removably in the said open channel portions, and cap means secured removably over the said heating element support means defining a vented enclosure, corresponding pairs of the said support wires being adapted to support a food cooking pan thereupon, motor support bracket means provided with channel portions removably secured to the lip portions of one of the said side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening.

8. Combination knockdown and erectable broiler and barbecue means comprising a transparent bottom pan and a pair of transparent side pans all mounted in "U-shaped" formation, each of the said transparent pans being provided with lip portions on two opposed edges thereof, primary clip means each provided with horizontal and vertical channel portions, the lip portions of the said transparent bottom pan engageable removably by the said horizontal channel portions, one lip portion of each of said transparent side pans engageable removably by the said vertical channel portion, heating element support means provided with channelled portions removably secured to the remaining lip portions of each of the said transparent side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said transparent side pans by virtue of the channel portions thereof resulting in open channel portions on each side of the said broiler and barbecue means, transparent pan means mounted removably in the said open channel portions, cap means secured removably over the said heating element support means defining a vented enclosure, corresponding pairs of the said support wires being adapted to support a transparent food cooking pan thereupon, motor support bracket means provided with channel portions removably secured to the lip portions of one of the said transparent side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening.

9. Combination knockdown and erectable broiler and barbecue means, comprising a bottom pan and a pair of side pans all mounted in "U-shaped" formation, each of the said pans being provided with lip portions on two opposed edges thereof, primary clip means each provided with horizontal and vertical channel portions, the lip portions of the said bottom pan engageable removably by the said horizontal channel portions, one lip portion of each of said transparent side pans engageable removably by the said vertical channel portion, heating element support means provided with channelled portions removably secured to the remaining lip portions of each of the said side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said side pans by virtue of the channel portions thereof resulting in open channel portions on each side of the said broiler and barbecue means, transparent pan means mounted removably in the said open channel portions, cap means secured removably over the said heating element support means defining a vented enclosure, corresponding pairs of the said support wires being adapted to support a food cooking pan thereupon, motor support bracket means provided with channel portions removably secured to the lip portions of one of the said side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening, the horizontal channel portions of the said primary clip means being cut away at the central portion thereof a magnitude equivalent to the width of the said motor support bracket means, the said heating element support means having its channelled portions cut away at the central portion thereof a magnitude equivalent to the width of the said motor support bracket means.

10. Combination knockdown and erectable broiler and barbecue means, comprising a transparent bottom pan and a pair of transparent side pans all mounted in "U-shaped" formation, each of the said transparent pans being provided with lip portions on two opposed edges thereof, primary clip means each provided with horizontal and vertical channel portions, the lip portions of the said transparent bottom pan engageable removably by the said horizontal channel portions, one lip portion of each of said transparent side pans engageable removably by the said vertical channel portion, heating element support means provided with channelled portions removably secured to the remaining lip portions of each of the said transparent side pans, heating element means mounted on the said heating element support means, electrical connection means connecting the said heating element means to a source of electrical supply, secondary clip means each including a pair of clip elements each equipped with reverse channel portions, a multiplicity of support wires interconnecting each pair of said clip elements, each of said clip means being removably secured to the free edges of the said transparent side pans by virtue of the channel portions thereof resulting in open channel portions on each side of the said broiler and barbecue means, transparent pan means mounted removably in the said open channel portions, cap means secured removably over the said heating element support means defining a vented enclosure, corresponding pairs of the said support wires being adapted to support a transparent food cooking pan thereupon, motor support bracket means provided with channel portions removably secured to the lip portions of one of the said transparent side pans, prime mover means equipped with reduction gearing mounted on the said motor support bracket means and provided with a driving gear having a polygonal central opening therein, electrical connection means connecting the said prime mover means in parallel to the said first-mentioned electrical connection means, one of the said support wires being provided with a semi-circular spit supporting portion, and spit means having a pointed end resting in the said semi-circular spit supporting portion, its other end having a reduced polygonal shoulder portion adapted to fit loosely in the said polygonal central opening, the horizontal channel portions of the said primary clip means being cut away at the central portion thereof a magnitude equivalent to the width of the said motor support bracket means, the said heating element support means having its channelled portions cut away at the central portion thereof a magnitude equivalent to the width of the said motor support bracket means.

11. Combination knockdown and erectable broiler and barbecue means, comprising a bottom pan and a pair of side pans all mounted in "U-shaped" formation, each of the said pans being provided with lip portions on two opposed edges thereof, primary clip means each provided with horizontal and vertical channel portions, the lip portions of the said bottom pan engageable removably by the said horizontal channel portions, one lip portion of each of said side pans engageable removably by the said vertical channel portion, heating element support means provided with channelled portions removably secured to the remaining lip portions of each of the said side pans, heating element means mounted on the said heating element support means, electrical connection means connecting the said heating element means to a source of electrical supply, secondary clip means each including a pair of clip elements each equipped with reversed channel portions, a multiplicity of support wires interconnecting each pair of said clip elements, each of said clip means being removably secured to the free edges of the said side pans by virtue of the channel portions thereof resulting in open channel portions on each side of the said broiler and barbecue means, pane means mounted removably in the said open channel portions, cap means secured removably over the said heating element support means defining a vented enclosure, pairs of the said support wires being adapted to support a food cooking pan thereupon, motor support bracket means provided with channel portions removably secured to the lip portion of one of the said side pans, auxiliary support bracket means provided with channel portions removably secured to the lip portions of the other of the said side pans, prime mover means equipped with reduction gearing mounted on the said motor support bracket means and provided with a driving gear, multiple spit supporting means including a rotating shaft coextensively connected to the said driving gear, planetary gearing mounted on the said driving shaft, multiple driving hub means radially disposed on the said planetary gearing and each equipped with a polygonal driving opening centrally thereof, disc means supported on the said rotating shaft and provided with a multiplicity of angularly formed cut out portions terminating in spit retaining pocket portions, and a multiplicity of spit means, each individual spit having its joint portion resting rotatably in one of the said pocket portions, and further provided on its driving end with a reduced polygonal shoulder portion loosely fitted within the said polygonal driving opening.

ALBERT PANKEN.

REFERENCES CITED

The following references are of record in the file of this patent:

UNITED STATES PATENTS

| Number | Name | Date |
|---|---|---|
| 47,532 | Everett | May 2, 1865 |
| 1,541,472 | Born | June 9, 1925 |
| 1,828,088 | Robinson | Oct. 20, 1931 |
| 2,466,349 | Anderson | Apr. 5, 1949 |
| 2,478,253 | Doner | Aug. 9, 1949 |
| 2,558,294 | Finzie | June 26, 1951 |
| 2,571,218 | Del Buttero | Oct. 16, 1951 |